United States Patent Office 3,237,004
Patented Feb. 22, 1966

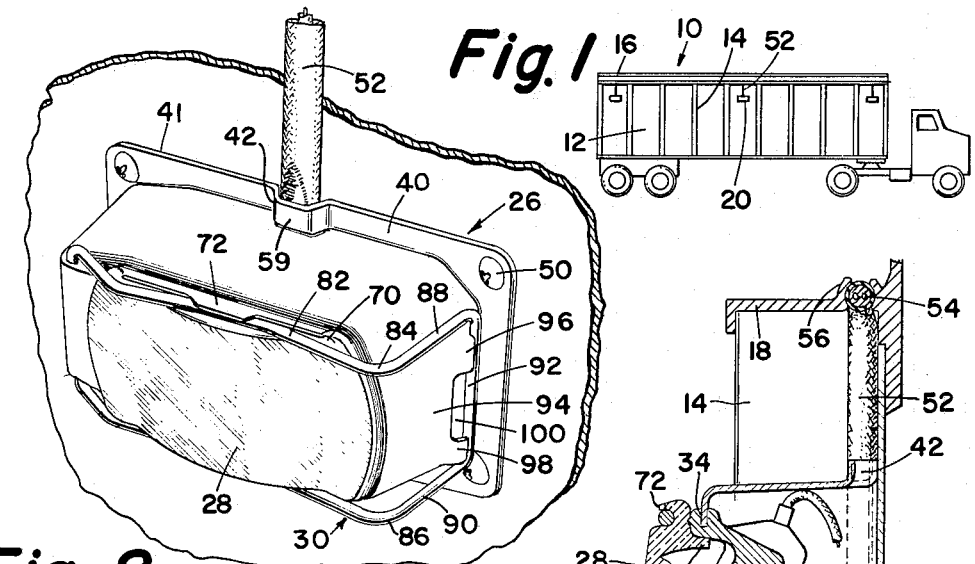
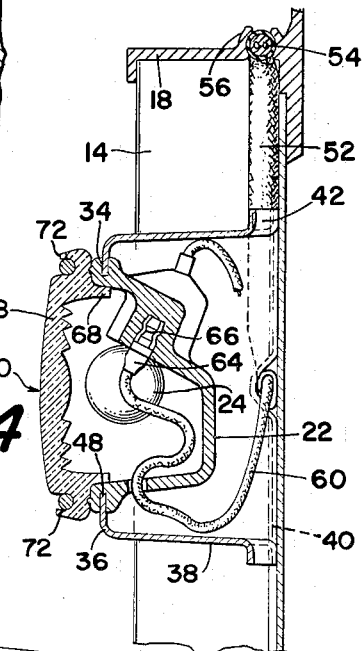
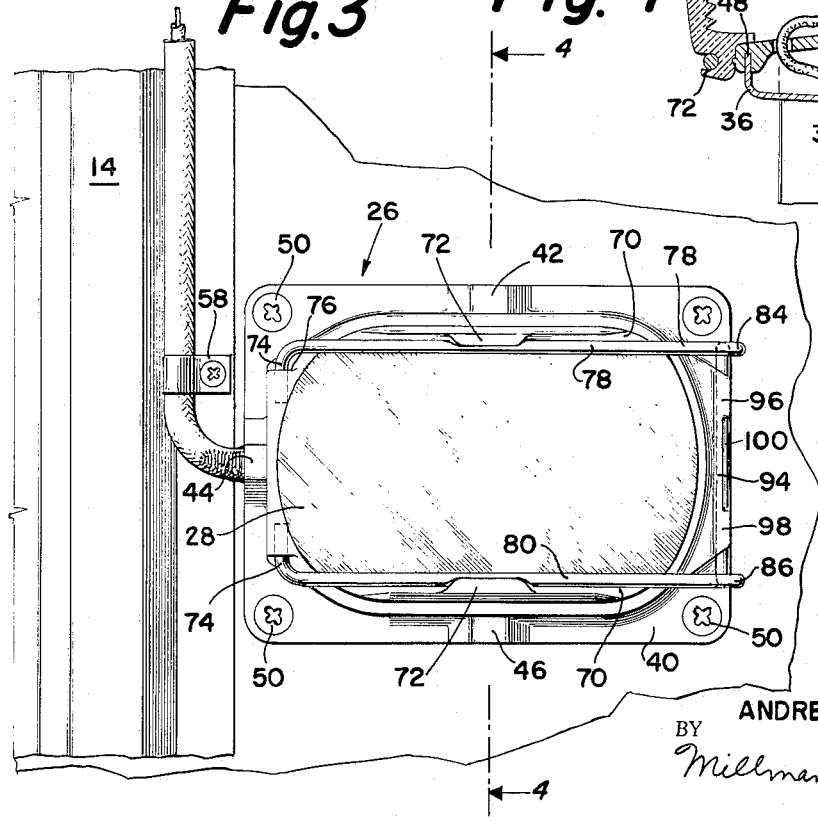
Feb. 22, 1966     A. ABOLINS     3,237,004
PROJECTION MOUNTED CLEARANCE LIGHTS FOR TRAILERS
Filed July 6, 1964
INVENTOR.
ANDREW ABOLINS
BY
*Millman and Jacobs*
ATTORNEYS

3,237,004
PROJECTION MOUNTED CLEARANCE
LIGHTS FOR TRAILERS
Andrew Abolins, Penndel, Pa., assignor to Strick Trailers, a Division of Fruehauf Corporation, Fairless Hills, Pa., a corporation of Michigan
Filed July 6, 1964, Ser. No. 380,590
9 Claims. (Cl. 240—8.2)

This invention relates to lights in general, but more particularly to clearance lights for vehicles such as trailers, and is a continuation-in-part of my copending applications Serial No. 257,285, filed February 8, 1963, now Patent No. 3,196,267, dated July 20, 1965, and Ser. No. 370,164, filed May 26, 1964.

For safety reasons, trailer bodies are required to be equipped with clearance lights along the top thereof. The clearance light disclosed in the former parent application is mounted in the top channel of a trailer body and has many advantages such as effecting a shock mounting between the bulbs and the trailer body, relieving pressure on the lens by employing a flexible bulb housing, resisting damage from sweeping tree branches, being easily accessible for replacing bulbs, etc. The clearance light disclosed in the later application has a modified lens closure and retainer and a mounting means which adapts the same for flush mounting on trailer bodies while retaining the advantages of the light disclosed in said former patent application.

The primary object of the present invention is to provide a clearance light with a modified lens closure and retainer and a mounting means which retains the advantages of the lights disclosed in the aforesaid applications but which adapts the light for mounting on trailer bodies so that it projects outwardly of the side wall. This is required in trailer bodies equipped with a top rail which will be covered on stacking, and thus clearance lights mounted in such rails will be injured, or in open top trailers which are covered with tarpaulin, in which case the clearance lights must be mounted below the tarpaulin.

Another object of the invention is to provide a projection mounted clearance light having a bracket to mount the same on a vehicle side wall which is comprised of a face including a cut-out portion for receiving an open-ended, cup-shaped bulb housing, a wall extending peripherally around said face in a direction substantially transverse to the plane of said face towards the vehicle wall, a lens and means hinged on said bracket and secured to said lens to selectively open and close the open end of the bulb housing at the cut-out portion of the bracket.

Another object of the invention is to provide a projection mounted clearance light of the character above described in which the peripheral wall of the mounting bracket is provided with a peripheral attaching flange, the flange including at least one notch to receive a conduit carrying electric current to the bulbs in the housing, the depth of the notch being so related to the diameter of the conduit that when the flange is ightly secured upon the vehicle wall, the notch clamps the conduit firmly therein.

Another object of the invention is to provide a clearance light which when mounted on the side wall of a vehicle projects outwardly of the plane thereof, the mounting bracket including means acting to automatically clamp the electric conduit feeding current to the bulbs in the light housing selectively in several desired positions when the bracket is secured upon the side wall.

Yet another object of the invention is to provide a clearance light which projects outwardly of the plane of the side wall of a vehicle and can be effectively secured thereon adjacent and to the rear of an external vertical post which will act to deflect the impact of tree branches on the mounted light.

These and other objects of the invention will become more apparent as the following description proceeds in conjunction with the accompanying drawings wherein:

FIG. 1 is a diagrammatic side elevational view of a trailer embodying the invention;

FIG. 2 is a perspective view of the clearance light shown mounted on the side of a trailer body;

FIG. 3 is a face view of the clearance light shown mounted adjacent a vertical post of the trailer; and FIG. 4 is an enlarged sectional view taken on the line 4—4 of FIG. 3.

Specific reference is now made to drawings in which similar reference characters are used for corresponding elements throughout.

Indicated generally at 10 is a conventional trailer body having side panels 12 which are appropriately secured upon and between spaced vertical posts 14. Longitudinal top rails 16, preferably of channel construction, are secured to the upper ends of the side panels and posts 14 of the body and serve to support either a roof sheet or a tarpaulin cover, each top rail including a lower horizontally extending flange 18.

The light 20 of the instant invention is mounted in the side panels at locations below the top rails. When the top rail is of an irregular open channel shape which is used on container-type trailer bodies, this rail is partially closed off because the bottom of the container has a track angle which overlies the top rail of the container below. Thus, the clearance light must be mounted below such a top rail so that it will not be damaged during stacking. When the top rail is of the channel type and the vehicle is one requiring a tarpaulin cover, the tarpaulin overlaps the channel top rail so that the clearance light must of necessity be located below the bottom edge of the tarpaulin in order to be seen.

Each light comprises a flexible insulated housing 22 in which one or more bulbs 24 are mounted, a rigid metallic mounting bracket 26 to support the housing, a lens 28 and a means 30 to removably retain the lens on the bracket selectively in front of or away from the housing.

The housing is formed of an elastomeric material such as neoprene and is preferably white for improved reflection. It is molded in a substantially cup-shaped form with a groove 34 that runs peripherally around its free edge at its open end.

The mounting bracket 26 includes a front face 36 and a wall 38 peripherally around the face 36 which extends rearwardly from said face 36 or inwardly towards the mounting surface or the side wall of the vehicle. The wall has a peripheral flange 40 at its free edge which extends therefrom in a plane substantially parallel to the face 36. The flange and wall have three notches therein which are indented outwardly away from the mounting surface 41 of the flange or towards the front face 36. A first notch 42 opens upwardly and is used to accept a lead wire conduit from a vertical direction. A second notch 44 opens sidewise and will accept a lead wire conduit from a horizontal direction. A third notch 46 opens downwardly and acts as a drainage port. In the face 36 of the mounting bracket 26 there is an inwardly extending portion 48 which forms the peripheral edge of a central cut-out portion whose shape and dimensions approximate those of the open end of the bulb housing 22. The edge or periphery 48 of the cut-out portion of the bracket is buttoned into the groove 34 to secure the housing 22 which is then mounted with the bracket on the side of the trailer. The bracket is secured in place by appropriate fasteners 50, such as screws, extending through the flange 40 of the mounting bracket and into the panel 12 through appropriate holes (not shown) adjacent the corners of the flange.

Electricity is fed to the bulbs 24 in the housing 22 by means of a lead wire conduit 52 which extends from a main conduit 54 which rests in groove 56 provided in the bottom flange 18 of top rail 16. The lead wire conduit 52 is tapped off the main conduit 54 and extends therefrom to the clearance light. Suitable clips 58 may be used to retain the conduit against the side wall.

The lead wire conduit can be fed to the bulb housing in one of two ways. It may be fed through the notch 42 in a vertical manner as shown in FIG. 2, or it may be fed to the bulb housing horizontally through notch 44 in a manner shown in FIG. 3.

Each notch is generally trapezoidal in cross-section and has a depth, i.e. the distance from the inner surface of its front face 59 to the inner surface 41 of the flange 40, which is less than the diameter of the conduit 52. The end of the lead wire 60 in the conduit 52 is equipped with a male connector 64 which is removably inserted by snap action into a female connector 66, the latter being carried by the bulb housing and being operatively connected to the bulb sockets. Thus, when the operator snaps the male connector 64 into the female bulb connector 66 and then tightly connects the mounting bracket to the side wall by screwing home the fastening members 50, the wall 59 of the notch 42 presses against and wedges the conduit 52 clampingly against the side wall thereby automatically fixing it in place.

The lens 28 includes an inwardly tapered or sloping peripheral flange 68 which extends into the open end of the housing 22 to provide a wedging action when closing the lens over the housing. The lens further includes upper and lower longitudinal open grooves 70 and upper and lower open lips 72 centrally over the grooves.

The lens closure and retaining means 30 is a substantially rectangular wire with split ends 74 that can be spread apart and slipped into journals 76 provided in the front face 36 adjacent one portion of the peripheral wall 38 which form a vertical hinge therefor. The wire also includes two spaced longitudinal portions 78 and 80 which are reversely bent or indented medially thereof as at 82. The wire portions 78 and 80 are pushed into the lens grooves 70 at which time the lips 72 snappingly hook over and retain said wire portions. Thus, the lens is itself retained by and moves with the retaining wire about a vertical axis through the split ends 74 in the journal 76.

The portions 78 and 80 are bent inwardly towards the flange 40 to form corners 84 and 86 which extend around the corner formed at the juncture of the face 36 with the peripheral wall 38 of mounting bracket 26, as seen in FIG. 2. This bending of the portions 78 and 80 into the corners 84 and 86 produces inwardly extending portions 88 and 90 which are substantially perpendicular to the longitudinal portions 78 and 80 and are joined at their ends by a transverse portion 92, thus completing the spring retaining wire 30. The portion of the peripheral wall 38 of the mounting bracket opposite the hinge position contains an outstruck arcuate-shaped keeper member 94 having two fingers 96 and 98 that extend back towards and are spaced from the wall 38 of the mounting bracket 26, there being a slot 100 between the fingers.

The arcuate shape of the keeper 94 enables the operator to lock the spring retaining wire with finger pressure applied to the corners 84 and 86 of the wire but once locked into position the wire cannot be opened unless a coin or end of a screw driver is placed in the notch 100 and leverage is applied against the keeper to stretch the wire in a direction away from and over the fingers. Thus, in operation, to close the housing with the lens, the wire is moved towards the bracket until the transverse end portion 92 thereof engages the keeper 94. By applying finger pressure on the corners 84 and 86 of the wire towards the bracket the end portion 92 rides over the keeper until it engages beneath the fingers 96 and 98 in which action the wire stretches and the stretch is taken up by the corners 84 and 86 of the wire 30. The operator is thus provided with a large enough mechanical advantage so as to enable him to use finger pressure to push the spring wire into this locked position.

When the operator is required to open the light for access to the bulbs he inserts a coin or a tool end into the notch 100 and prys the end portion 92 of the wire, which action again stretches the wire until the end portion 92 is free of the fingers, whereupon the wire then releases the lens from the opening of the face of the housing 22. The wedging action of the lens 28 in flexible housing 22 cooperates with the spring closure means to enhance the locking and unlocking action.

It will also be noted that it is desirable to locate the mounting bracket on a side panel in a position adjacent and to the rear of a vertical post 14 for appearance purposes and to permit the post to take the impact of sweeping branches and thereby prevent them from striking the lens with a force of any serious magnitude. This is accomplished in the manner set forth hereinabove except that the conduit 52 is made to run vertically along the edge of the post and is made to extend through the side opening notch 44 where it is also automatically flattened and clamped in place. Further, by locating the hinge portion of the mounting bracket towards the adjacent post the sweeping branches, even if they should manage to strike the lens, could not shift the lens sidewise or cause the retainer to open.

While a preferred embodiment of the invention has here been shown and described, a skilled artisan may make minor variations without departing from the spirit of the invention and the scope of the appended claims.

I claim:

1. A clearance light for a vehicle comprising a mounting bracket having a front face including a cut-out portion, a peripheral wall extending rearwardly therefrom and a peripheral flange extending from said wall in a plane substantially parallel to said front face, an open-faced bulb housing, means mounting said housing on said bracket with said open face of said housing at said cut-out portion of said bracket, a lens to cover said open face of said housing, a spring retainer hinged to said bracket extending across said lens, and keeper means on said wall to releasably lock said spring retainer and hold said lens in position to close off said open face of said housing.

2. The combination of claim 1 wherein said housing is flexible and said means mounting it at said cut-out portion of said bracket includes a groove peripherally around its open face receiving the edge of the bracket around said cut-out portion.

3. The combination of claim 1 wherein said lens includes an elongated groove longitudinally across and in said lens, said spring retainer including a longitudinal portion received in said groove and a lip on said lens extending partially over said groove and engaging said longitudinal portion of said spring retainer.

4. The combination of claim 1 wherein said keeper is an arcuate member extending outwardly of said wall of said bracket and terminating in an edge spaced from said wall, said spring retainer including a transverse portion adapted to ride over said arcuate member until it engages said edge thereof in the locked position.

5. The combination of claim 4 wherein said arcuate member includes a pair of inwardly curving fingers, said edge being the free end of each of said fingers, and a transversely extending notch between said fingers adapted to receive a prying tool to engage said transverse portion of said wire and extend the same around the fingers in the unlocking action.

6. A clearance light for a vehicle including a side wall comprising a mounting bracket having a front face with a cut-out portion, a wall extending peripherally rearwardly therefrom, a flange extending from said wall in a plane substantially parallel to said face, an open-faced bulb housing, means mounting said housing on said bracket with said open face at said cut-out portion, a lens to cover said open face of said housing, means to selectively retain said lens in position to cover and uncover said open face of said housing, a notch in said flange indented towards said front face and a conduit having leads for providing electrical energy to said bulb housing, said conduit passing through said notch, and the diameter of said conduit exceeding the depth of said notch so that when said bracket is secured in place on said side wall, said notch clamps said conduit in place against said side wall.

7. A clearance light for a vehicle including a side wall comprising a mounting bracket having a front face with a cut-out portion, a wall extending peripherally rearwardly therefrom, a flange extending from said wall in a plane substantially parallel to said face, an open-faced bulb housing, means mounting said housing on said bracket with said open face at said cut-out portion, a lens to cover said open face of said housing, means to selectively retain said lens in position to cover and uncover said open face of said housing, a plurality of spaced notches in said flange indented towards said front face, and a conduit having leads for providing electrical energy to said bulb housing, said conduit passing through a selected notch, and the diameter of said conduit exceeding the depth of said notch so that when said bracket is secured in place on said side wall, said notch clamps said conduit in place against said side wall.

8. The combination of claim 6 and a further notch in said flange indented towards said front face and serving as a drainage port.

9. In a vehicle having a side wall and at least one vertical post secured thereto, a clearance light comprising a mounting bracket having a front face with a cut-out portion, a wall extending peripherally rearwardly therefrom, a flange extending from said wall in a plane substantially parallel to said face, an open-faced bulb housing, means mounting said housing on said bracket with said open face at said cut-out portion, a lens to cover said open face of said housing, means to selectively retain said lens in position to cover and uncover said open face of said housing, a notch in said flange opening towards and adjacent said post, and a conduit having leads for providing electrical energy to said bulb housing, a portion of said conduit extending vertically alongside said post, said conduit passing through said notch, and the diameter of said conduit exceeding the depth of said notch so that when said bracket is secured in place on said side wall, said notch clamps said conduit in place against said side wall.

References Cited by the Examiner
UNITED STATES PATENTS

| | | | |
|---|---|---|---|
| 1,876,852 | 9/1932 | Carbonara | 240—41.55 X |
| 2,076,020 | 4/1937 | Fraser | 240—7.1 |
| 2,208,155 | 7/1940 | Daehler | 240—7.45 X |
| 2,255,273 | 9/1941 | Sauer | 240—7.1 |
| 2,707,747 | 5/1955 | De Frees | 240—41.55 X |

NORTON ANSHER, *Primary Examiner.*